(12) United States Patent
Bauer et al.

(10) Patent No.: US 7,771,149 B2
(45) Date of Patent: Aug. 10, 2010

(54) COMBINATION OF A SCREW MEMBER, A WASHER AND A SLEEVE AND ALSO A METHOD OF PRODUCING SUCH A COMBINATION

(75) Inventors: Robert Bauer, Röfingen (DE); Stephan Völk, Friedberg (DE)

(73) Assignee: ElringKlinger AG, Dettingen (DE)

( * ) Notice: Subject to any disclaimer, the term of this patent is extended or adjusted under 35 U.S.C. 154(b) by 24 days.

(21) Appl. No.: 11/973,511

(22) Filed: Oct. 9, 2007

(65) Prior Publication Data
US 2008/0152458 A1 Jun. 26, 2008

Related U.S. Application Data

(63) Continuation of application No. PCT/EP2006/010069, filed on Oct. 19, 2006.

(51) Int. Cl.
*F16B 43/00* (2006.01)

(52) U.S. Cl. ...................... 411/533; 411/353

(58) Field of Classification Search .................. 411/533, 411/107, 147, 521, 522, 999, 353
See application file for complete search history.

(56) References Cited

U.S. PATENT DOCUMENTS

| | | | | | |
|---|---|---|---|---|---|
| 1,937,197 | A | * | 11/1933 | Halladay | 293/102 |
| 2,919,736 | A | * | 1/1960 | Kann | 411/353 |
| 3,343,581 | A | * | 9/1967 | Martin et al. | 411/349 |
| 3,570,836 | A | * | 3/1971 | Pettavel | 269/92 |

FOREIGN PATENT DOCUMENTS

EP 0 751 305 A1 1/1997

* cited by examiner

*Primary Examiner*—Gary Estremsky

(57) ABSTRACT

The invention relates to a combination of a screw member comprising a screw head, a threaded portion and a shank portion which is arranged between the screw head and the threaded portion and has an external diameter that is smaller than the external diameter of the threaded portion, a washer incorporating a passage opening for the screw member and a sleeve the internal diameter of which is greater than the external diameter of the threaded portion of the screw member, whereby said combination is producible in a simple manner but it is nevertheless ensured that the sleeve and the washer are held securely on the screw member.

15 Claims, 6 Drawing Sheets

COMBINATION OF A SCREW MEMBER, A WASHER AND A SLEEVE AND ALSO A METHOD OF PRODUCING SUCH A COMBINATION

This application is a continuation of International application No. PCT/EP2006/010069 filed on Oct. 19, 2006.

RELATED APPLICATION

The present disclosure relates to the subject-matter which was disclosed in the international patent application No. PCT/EP2006/010069 dated Oct. 19, 2006. The entire description of this earlier application is incorporated by reference thereto as a constituent part of the present description ("incorporation by reference").

FIELD OF DISCLOSURE

The present invention relates to a combination of a screw member comprising a screw head, a threaded portion and a shank portion which is arranged between the screw head and the threaded portion and has an external diameter that is smaller than the external diameter of the threaded portion, a washer incorporating a passage opening for the screw member and a sleeve the internal diameter of which is greater than the external diameter of the threaded portion of the screw member.

BACKGROUND

Such a combination is known from DE 199 24 502 C2. In this known combination, the sleeve is fixed to the washer by an adhered, welded or soldered joint. The washer and/or the sleeve are slit so that the sleeve and/or the washer expand when slipping the narrow section formed by the washer over the threaded portion of the screw member and then snap back again after the narrow section has been pushed completely over the threaded portion.

The washer and the sleeve are held captive on the screw member once they have snapped back.

A further combination of a screw member and a washer together with a sleeve which are held captive on the screw member is known from DE 195 10 349 A1. In this combination, the washer comprises a deep-drawn opening having a collar which is surrounded by the sleeve in clamping manner. For the purposes of clamping the collar of the washer, the inside of the sleeve must be provided with a chamfer at the screw head end thereof. The retention of the sleeve on the washer, which is only effected by the clamping effect produced by the collar projecting into the sleeve, is not particularly secure.

SUMMARY OF THE INVENTION

The object of the present invention is to provide a combination of the type mentioned hereinabove which is producible in a simple manner but which nevertheless ensures that the sleeve and the washer are held securely on the screw member.

In accordance with the invention, this object is achieved in the case of a combination comprising the features indicated in the preamble of claim 1 in that the passage opening in the washer comprises a first region having a diameter which is greater than the external diameter of the shank portion of the screw member and smaller than the external diameter of the threaded portion of the screw member, and a second region having a diameter which is greater than the external diameter of the threaded portion of the screw member, and in that the sleeve and the washer are connected to one another in such a manner that the sleeve and the washer are held captive on the screw member.

The concept underlying the present invention is that of feeding the threaded portion of the screw member through the second region of the passage opening in the washer having a diameter which is greater than the external diameter of the threaded portion of the screw member until the shank portion of the screw member enters the passage opening and then transferring the shank portion of the screw member from the second region of the passage opening into the first region of the passage opening through which the threaded portion of the screw member having a diameter greater than the diameter of the first region of the passage opening can then no longer be moved in the reverse direction. In consequence, the washer is held captive on the screw member in a simple manner.

For its part, the sleeve is then held captive on the screw member by virtue of it being connected to the washer.

Hereby, the connection between the sleeve and the washer can be effected directly or indirectly with the help of an additional component which is connected to the sleeve on the one hand and to the washer on the other.

Since the threaded portion of the screw member can be moved through the second region of the passage opening in the washer, it is not necessary to use a slit washer and/or a slit sleeve; rathermore, a slot-free sleeve and a slot-free washer can be used in the combination in accordance with the invention.

In a preferred embodiment of the invention, provision is made for the first region and the second region of the passage opening to be connected to one another in such a way that the screw member can be transferred from the second region into the first region of the passage opening when the shank portion of the screw member extends through the passage opening in the washer.

In the assembled state of the combination, the shank portion of the screw member preferably extends through the first region of the passage opening in the washer.

In principle, the first region and the second region of the passage opening may be provided in the washer in such a manner that they do not overlap and they may be connected to one another by means of a channel arranged therebetween.

In a preferred embodiment of the invention however, provision is made for the first region and the second region of the passage opening in the washer to partly overlap one another. Due to this overlapping, the overall proportion of the washer occupied by the passage opening in the washer is reduced so that the effective surface area of the washer by means of which the washer rests against the screw head is kept as large as possible.

The centre of the first region of the passage opening in the washer is preferably arranged substantially centrally of the washer. The effect is thereby achieved that the screw member is substantially coaxial with the washer in the assembled state of the combination.

By contrast however, the centre of the second region of the passage opening in the washer is preferably displaced outwardly relative to the centre of the first region of the passage opening in the washer, i.e. it is displaced towards the outer edge of the washer.

In one embodiment of the combination in accordance with the invention, provision is made for the edge of the first region of the passage opening in the washer and the edge of the second region of the passage opening in the washer to merge into one another at a transitional zone, whereby—as seen from the centre of the first region of the passage opening—the edge of the transitional zone is curved convexly. In this embodiment of the invention, this thereby results in a substantially keyhole shaped passage opening.

As an alternative thereto, provision is made in a second embodiment of the invention for the edge of the first region of the passage opening in the washer and the edge of the second region of the passage opening in the washer to merge into one another at a transitional zone, whereby the edge of the transitionally zone runs substantially tangentially to the edge of the first region of the passage opening and/or substantially tangential to the edge of the second region of the passage opening. In this embodiment, the threaded portion of the screw member can be fed through the second region of the passage opening in the washer in a particularly simple manner.

In order to enable the sleeve to be connected indirectly to the washer, provision may be made for the combination to comprise at least one ring-shaped element which is fixed to the washer and has a seating for the screw head end of the sleeve.

The ring-shaped element may be in the form of a resilient element in order to decouple the combination from vibrations occurring in the components that are to be connected together by the combination.

The ring-shaped element may, in particular, comprise an elastomer material.

The screw head end of the sleeve can be held on the ring-shaped element in positive and/or force-locking manner.

In particular, provision may be made for the screw head end of the sleeve to be latched to the ring-shaped element.

In principle, the ring-shaped element can be fixed to the washer in an arbitrary manner.

A particularly durable and easy to produce connection of the ring-shaped element to the washer results if the ring-shaped element is adhered to the washer.

Furthermore, the present invention relates to a method of producing a combination of a screw member comprising a screw head, a threaded portion and a shank portion which is arranged between the screw head and the threaded portion and has an external diameter that is smaller than the external diameter of the threaded portion, a washer incorporating a passage opening for the screw member and a sleeve the internal diameter of which is greater than the external diameter of the threaded portion of the screw member.

A further object of the present invention is to provide a method of producing such a combination which is simple to effect and leads to the sleeve and the washer being securely retained together as well as to the screw member.

In accordance with the invention, this object is achieved by a method which comprises the following method steps:

providing a washer incorporating a passage opening which includes a first region having a diameter that is greater than the external diameter of the shank portion of the screw member and is smaller than the external diameter of the threaded portion of the screw member, and a second region having a diameter which is greater than the external diameter of the threaded portion of the screw member;

inserting the screw member into the passage opening in the washer in such a manner that the threaded portion of the screw member moves through the second region of the passage opening in the washer until the shank portion of the screw member extends through the passage opening;

transferring the shank portion of the screw member from the second region of the passage opening in the washer into the first region of the passage opening in the washer;

inserting the screw member into the sleeve;

connecting the sleeve to the washer in such a manner that the sleeve and the washer are held captive on the screw member.

Furthermore, a preferred embodiment of this method comprises the following:

fixing a ring-shaped element to the washer;

connecting the sleeve to the ring-shaped element in such a manner that the sleeve, the ring-shaped element and the washer are held captive on the screw member.

Hereby, the ring-shaped element can be fixed to the washer before or after the insertion of the screw member into the passage opening in the washer, for example, by means of an adhesive.

Further features and advantages of the invention form the subject matter of the following description and the graphical illustration of exemplary embodiments.

BRIEF DESCRIPTION OF THE DRAWINGS

Similar or functionally equivalent elements are designated by the same reference symbols in each of the Figures.

DETAILED DESCRIPTION OF THE INVENTION

Figure 1:
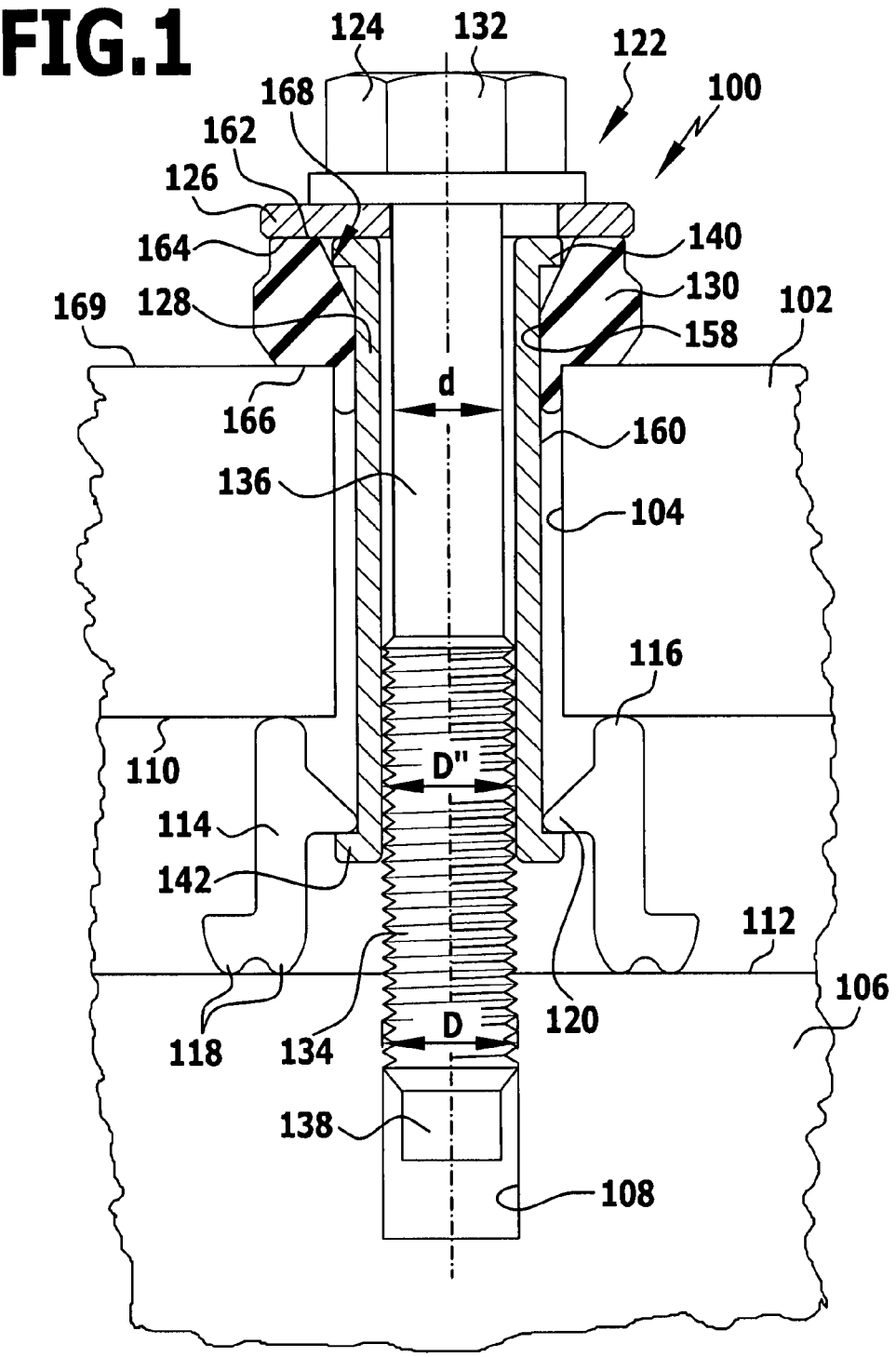
FIG. 1 shows a schematic sectional view through an assembly consisting of a first component and a second component which are fixed together by means of a screw member having a washer and a sleeve that are held captive on the screw member and are also decoupled from vibration by means of elastomer elements.

An assembly having the general reference 100 which is illustrated in sectional manner in FIG. 1 comprises a first component 102 having a substantially cylindrical passage opening 104, a second component 106 having a threaded blind hole 108, a ring-shaped elastomer sealing element 114 comprising an upper sealing lip 116 and lower sealing lips 118 arranged between a lower surface 110 of the first component 102 and an upper surface 112 of the second component 106 and also a flange 120 projecting radially into the interior of the elastomer sealing element 114, and a combination 122 consisting of a screw member 124, a washer 126 held captive on the screw member 124, a hollow cylindrical sleeve 128 held captive on the screw member 124 and a ring-shaped element 130 which surrounds the screw-head-end portion of the sleeve 128 in ring-like manner and is fixed to the washer 126 by means of an adhesive for example.

The screw member 124 comprises a screw head 132 which may be in the form of a hexagonal screw head for example, a threaded portion 134 having an external diameter D, a shank portion 136 which is arranged between the threaded portion 134 and the screw head 132 and has an external diameter d that is smaller than the external diameter D of the threaded portion 134, and an end portion 138 which adjoins the end of the threaded portion 134 remote from the screw head 132 and the external diameter of which is smaller than the external diameter D of the threaded portion 134 and smaller than the external diameter d of the shank portion 134 of the screw member 124.

Figure 2:
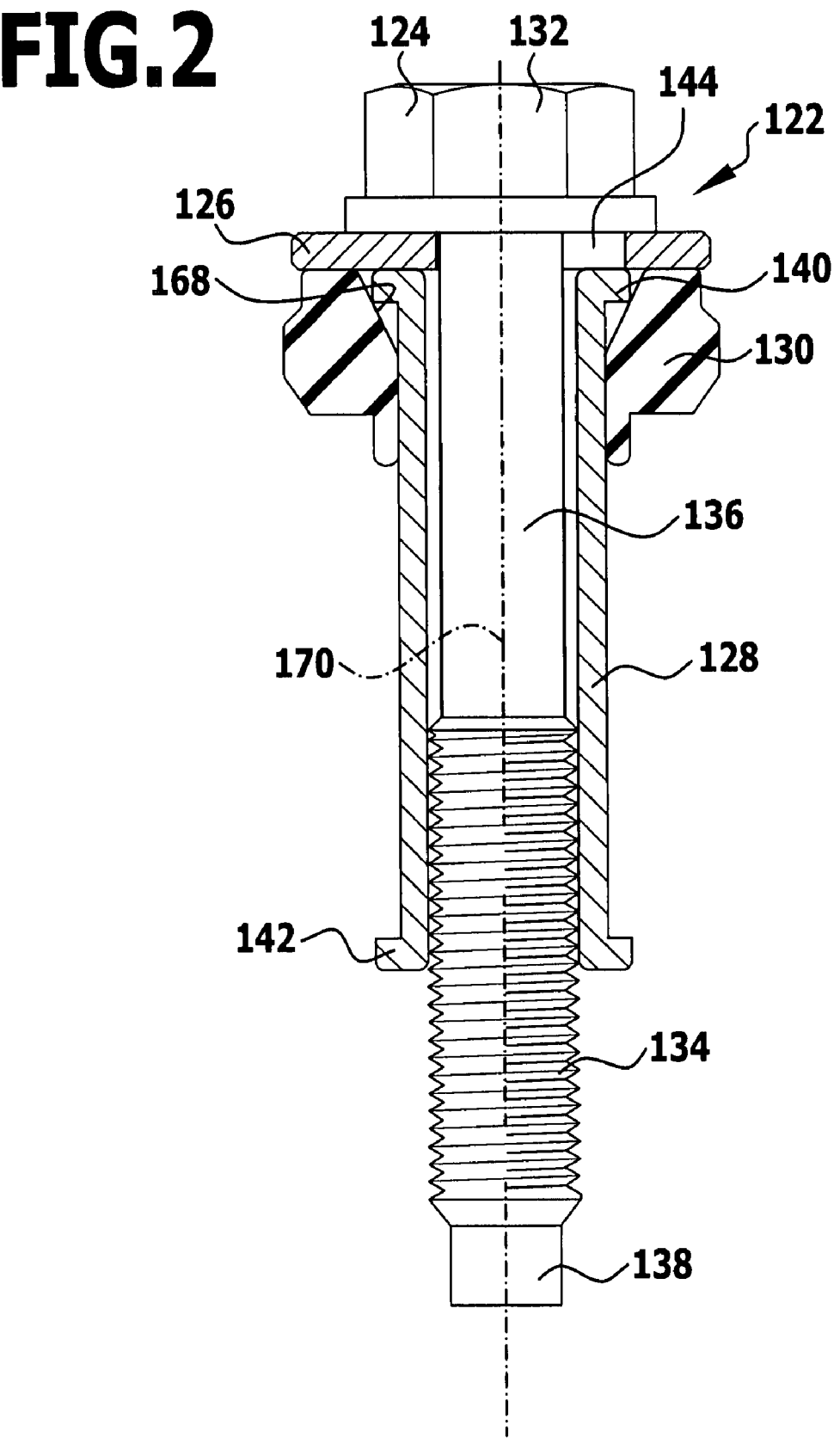
FIG. 2 a schematic longitudinal sectional view through the screw member comprising a washer, a sleeve and an elastomer element depicted in FIG. 1.

As can best be seen from FIGS. 1 and 2, the sleeve 128 is of hollow cylindrical shape and it is provided at the screw head end thereof with a screw-head-end flange 140 that projects outwardly in the radial direction and, at the end thereof remote from the screw head 132, it is provided with a threaded-portion flange 142 that projects outwardly in the radial direction.

Figure 3:
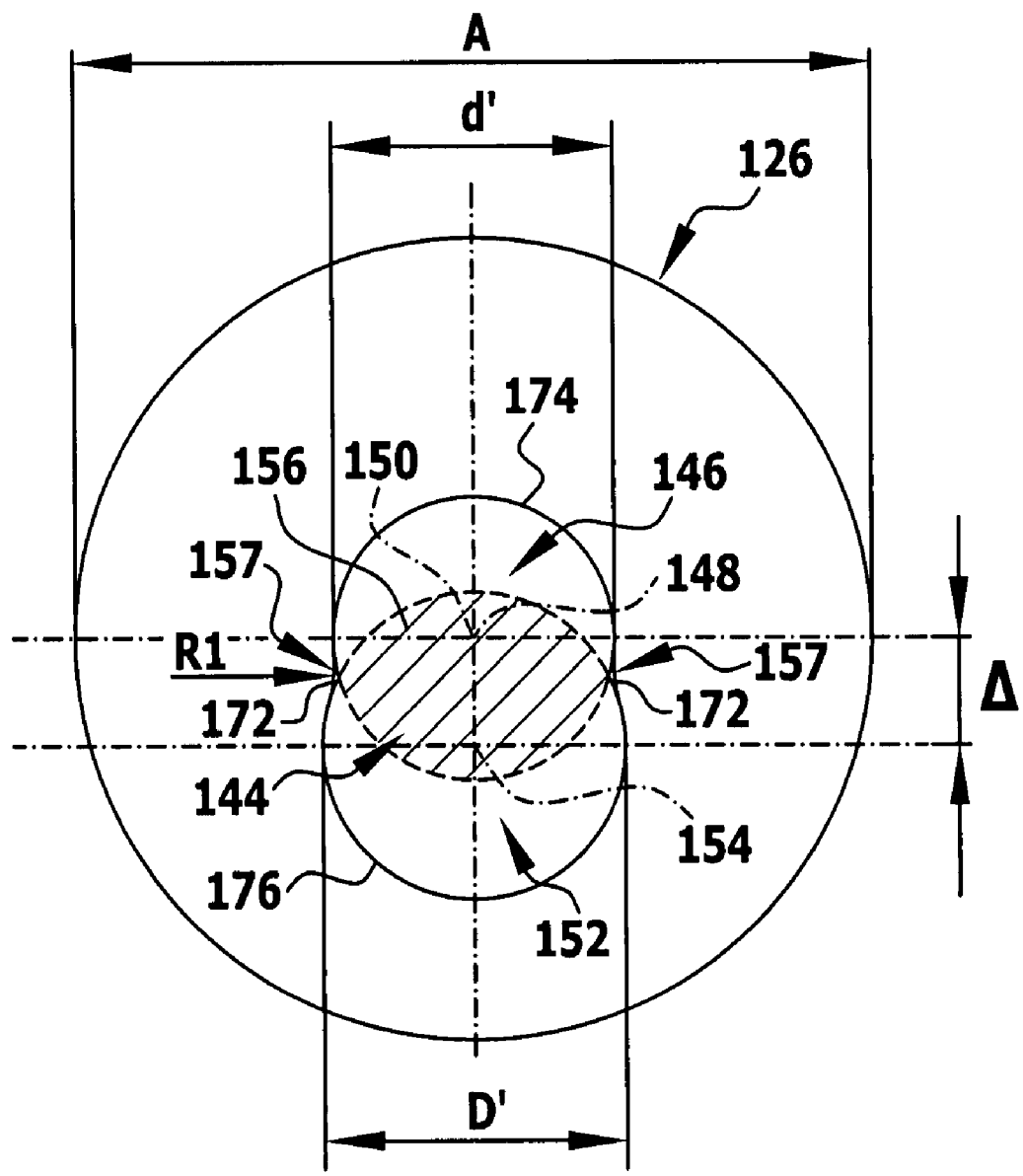
FIG. 3 a plan view from above of the washer depicted in FIGS. 1 and 2.

As can best be seen from FIG. 3, the washer 126 is in the form of a substantially flat, circular disc of external diameter A which is provided with a passage opening 144 that comprises a first circular region 146 the central point or centre 148 of which coincides with the central axis 150 of the washer 126 and a second circular region 152 the central point or centre 154 of which is displaced outwardly by the distance A with respect to the centre 148 in a direction aligned radially relative to the central axis 150.

The first region 146 of the passage opening 144 arranged centrally of the washer 126 has a diameter d' which is greater than the external diameter d of the shank portion 136 of the screw member 124 and is smaller than the external diameter D of the threaded portion 134 of the screw member 124.

The second region 152 of the passage opening 144 arranged off-centre of the washer 126 has a diameter D' which is greater than the external diameter D of the threaded portion 134 of the screw member 124.

As can be seen from FIG. 3, the first region 146 and the second region 152 of the passage opening 144 overlap in the region 156 marked by shading.

The circular arc shaped edge 174 of the first region 146 of the passage opening 144 and the circular arc shaped edge 176 of the second region 152 of the passage opening 144 merge into one another at two transitional zones 157, whereby the edges 172 of the transitional zones 157—as seen from the centre 148 of the first region 146 of the passage opening 144—are convexly curved (with a radius of curvature $R_1$).

The sleeve 128, the washer 126 and the screw member 124 are preferably formed from a metallic material, and in particular from a steel material.

The ring-shaped element 130 is preferably formed from a resilient material, for example, from an elastomer material.

As can best be seen from FIG. 1, the ring-shaped element 130 has an internal contact surface 158 for application to the exterior 160 of the sleeve 128, a flat washer-side contact surface 162 for application to the lower surface 164 of the washer 126 and a component contact surface 166 remote from the washer 126 and the screw head 132 for application to an upper surface 169 of the first component 102.

The ring-shaped element 130 is coaxial with the washer 126 and the washer-side contact surface 162 thereof is adhered to the lower surface 164 of the washer 126.

The inner surface of the ring-shaped element 130 is chamfered at the upper washer-end part thereof so that the inner space surrounded by the ring-shaped element 130 flares, conically for example, towards the washer-side contact surface 162, and the upper washer-end section of this inner space forms a seating 168 for the screw-head-end flange 140 of the sleeve 128. The section of the inner wall of the ring-shaped element 130 running at an angle relative to the central axis of the ring-shaped element 130 forms an undercut which retains the screw-head-end flange 140 of the sleeve 128 in the seating 168 when the screw-head-end flange 140 is accommodated in the seating 168.

One proceeds as follows in order to produce the combination 122 consisting of the screw member 124, the washer 126 held captive on the screw member 124, the sleeve 128 held captive on the screw member 124 and the ring-shaped element 130:

Firstly, the ring-shaped element 130 is adhered to the washer 126.

The interior of the ring-shaped element 130 is dimensioned such that it is possible to insert the threaded portion 134 of the screw member 124 forwardly through the off-centre second region 152 of the washer 126.

The screw member 124 is then inserted into the passage opening 144 in the washer 126 in a manner such that the threaded portion 134 of the screw member 124 moves through the second region 152 of the passage opening 144 in the washer 126 until the shank portion 136 of the screw member 124 enters the passage opening 144. This is easily possible, since the second region 152 of the passage opening 144 has a diameter D' which is greater than the external diameter D of the threaded portion 134 of the screw member 124.

Figure 4:
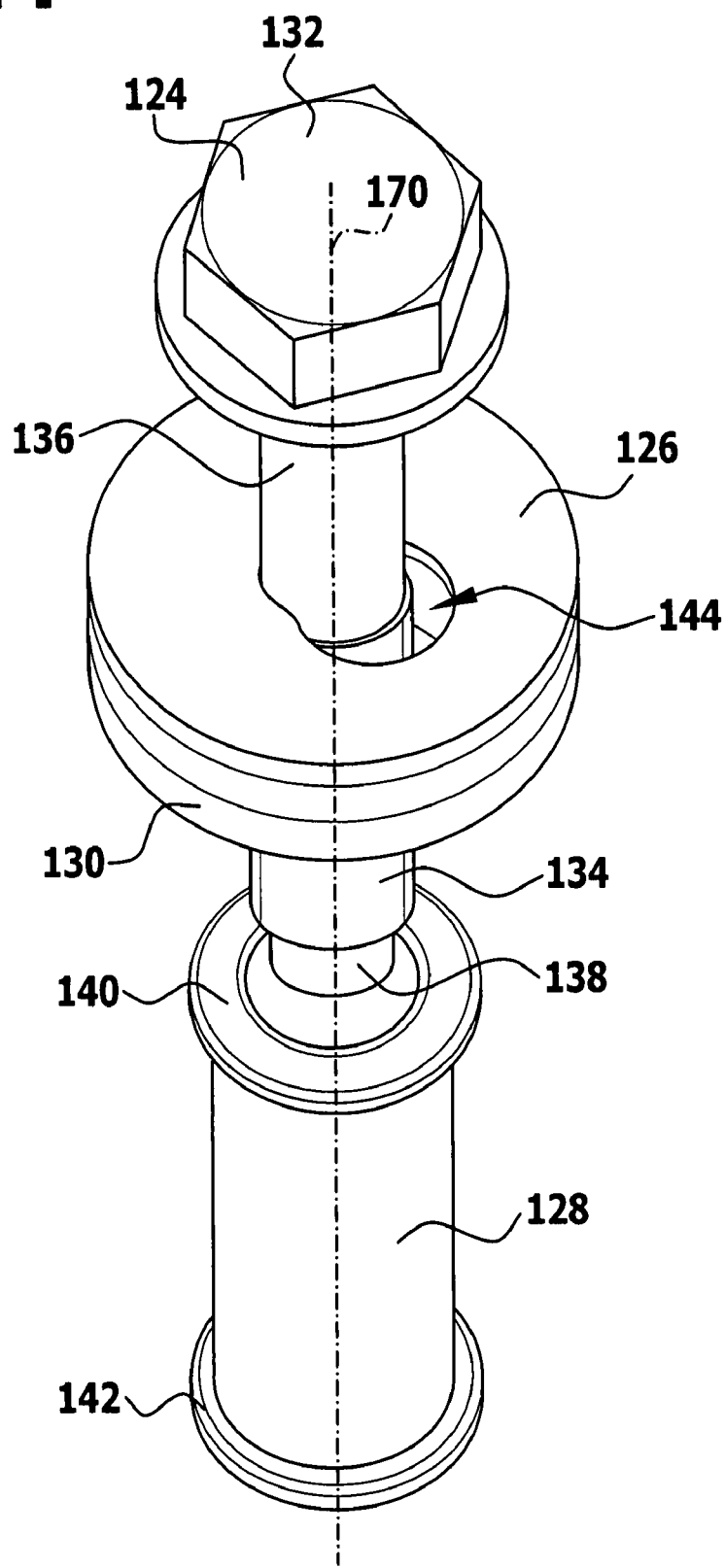
FIG. 4 a schematic perspective illustration of the screw member inserted into the washer and the sleeve.

Thereafter, the shank portion 136 of the screw member 124 is transferred from the second region 152 of the passage opening 144 in the washer 126 into the first region 146 of the passage opening 144 in the washer 126 by pushing the screw member 124 transversely relative to the longitudinal direction 170 thereof. In consequence, the state illustrated in FIG. 4 is reached wherein the shank portion 136 of the screw member 124 extends through the first region 146 of the passage opening 144 in the washer 126.

Next, the screw member 124 is inserted into the sleeve 128 the internal diameter D" of which is greater than the external diameter D of the threaded portion 134 of the screw member 124.

Firstly hereby, the washer 126 together with the ring-shaped element 130 affixed thereto is pushed against the screw head 132 by the sleeve 128, and subsequently the lower section of the interior of the ring-shaped element 130 remote from the washer 126 is expanded by the screw-head-end flange 140 of the sleeve 128 due to its overcoming of the resilient restoring force of the ring-shaped element 130 so that the screw-head-end flange 140 passes this lower section of the ring-shaped element 130 and enters into the seating 168 of the ring-shaped element 130 where it is restrained by the undercut of the ring-shaped element 130 so that the sleeve 128 is latched to the ring-shaped element 130 and the washer 126.

Moreover, the restored ring-shaped element 130 exerts a contact pressure on the outer surface 160 of the sleeve 128 so that the sleeve 128 is also connected to the ring-shaped element 130 and thus to the washer 126 by virtue of the frictional engagement.

Since the ring-shaped element 130 and the seating 168 are aligned coaxially with the central axis 150 of the washer 126, the sleeve 128 is also held on the washer 126 coaxially relative to the central axis 150 thereof.

Furthermore, as the lower end part of the sleeve 128 extends up to the threaded portion 134 of the screw member 124 and the internal diameter D" of the sleeve 128 is only slightly greater than the external diameter D of the threaded portion 134 of the screw member 124, the longitudinal direction 170 of the screw member 124 is substantially coaxial with the longitudinal axis of the sleeve 128 and thus the central axis 150 of the washer 126.

Consequently, after the insertion of the screw member 124 into the sleeve 128 and following the engagement of the screw-head-end flange 140 of the sleeve 128 in the ring-shaped element 130, it is no longer possible to displace the screw member 124 from the central first region 146 of the passage opening 144 in the washer 126 into the off-centre second region 152 of the passage opening 144.

Hence, in this state, the threaded portion 134 of the screw member 124 having the external diameter D can no longer return through the passage opening 144 in the washer 126 since the diameter d' of the first region 146 of the passage opening 144 is smaller than the external diameter D of the threaded portion 134. The sleeve 128, the washer 126 and the ring-shaped element 130 affixed thereto are thus held captive on the screw member 124.

In the installed state of the assembly 100 as is illustrated in FIG. 1, the external thread of the threaded portion 134 of the screw member 124 is twisted into the internal thread of the threaded blind hole 108 in the second component 106. The screw member 124 and the sleeve 128 extend through the passage opening 104 in the first component 102.

The sleeve 128 and the washer 126 are supported on the first component 102 via the resilient ring-shaped element 130 so that the sleeve 128, the washer 126 and the screw member 124 are vibrationally-decoupled from the first component 102.

Furthermore, due to the flange 120 of the elastomer sealing element 114 arranged between the first component 102 and the second component 106 which laps over the flange 142 at the threaded portion end of the sleeve 128, there is provided a vibration decoupling means between the two components 102 and 106.

Figure 5:
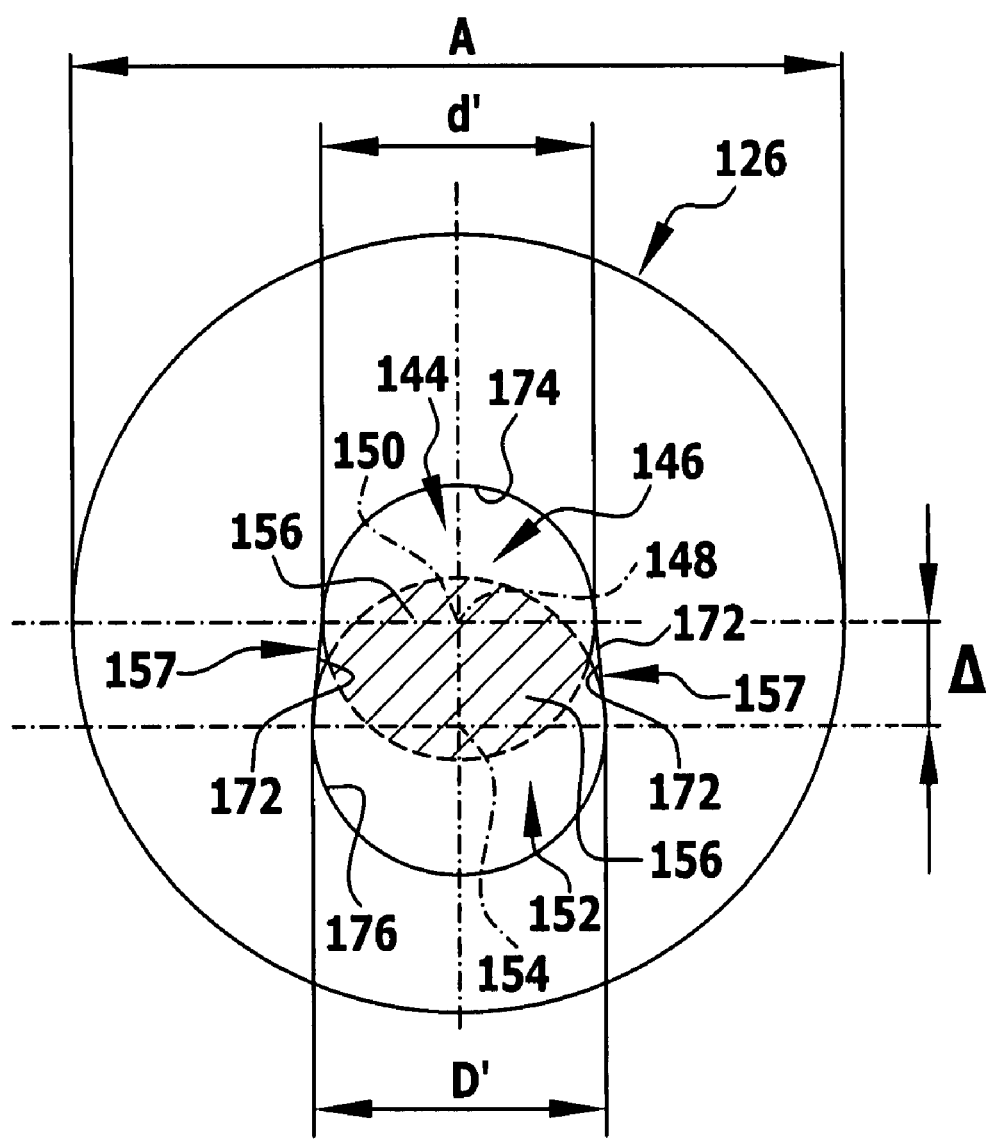
FIG. 5 a plan view from above of a second embodiment of a washer having a differently formed passage opening.
Figure 6:
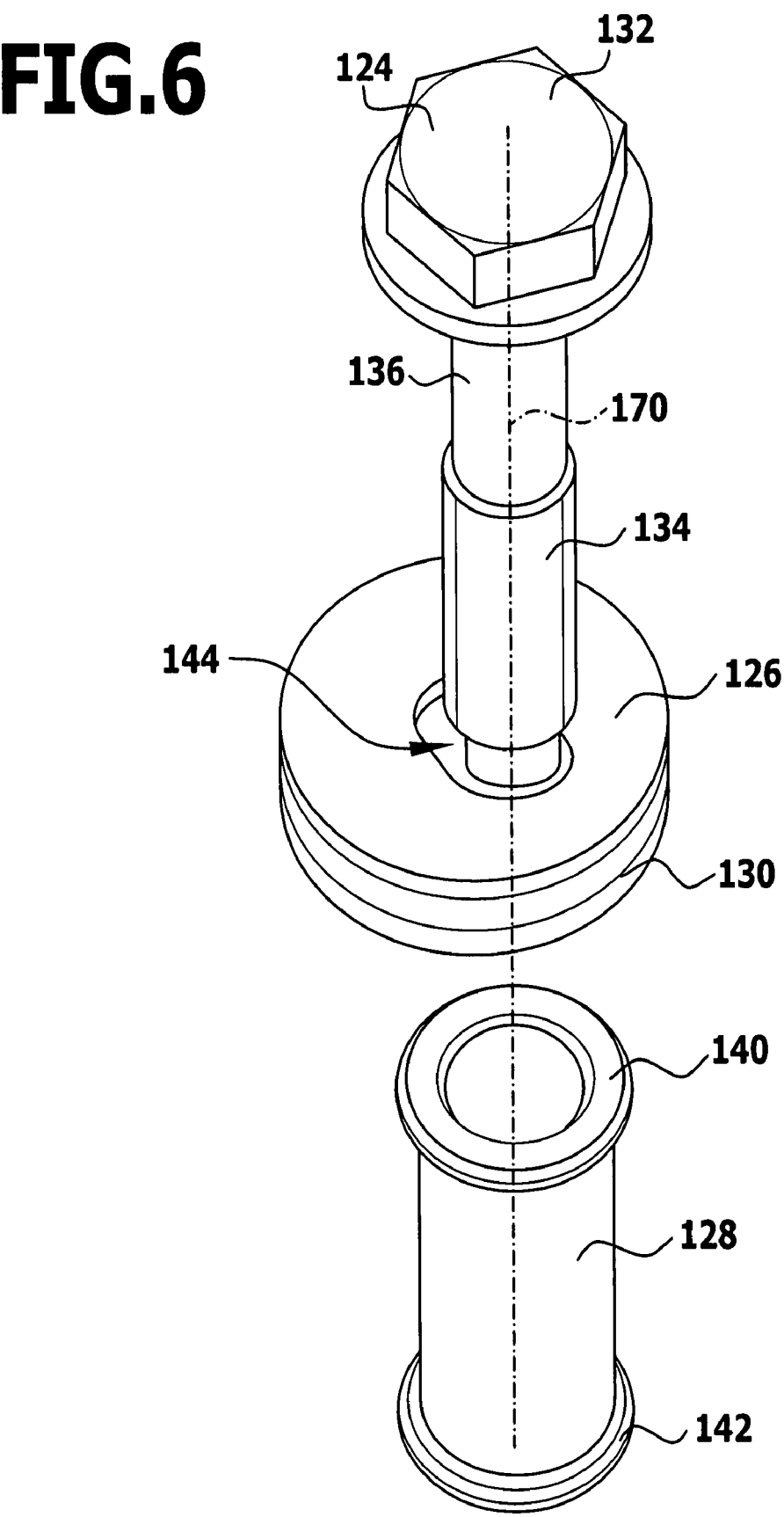
FIG. 6 a schematic perspective illustration of the process of inserting the screw member into the washer.

In FIGS. 5 and 6, there is illustrated a second embodiment of a combination 122 consisting of a screw member 124, a sleeve 128 held captive on the screw member 124 and a washer 126 that has a ring-shaped element 130 affixed thereto and is held captive on the screw member 124, which embodiment differs from the first embodiment described hereinabove only in that the transitional zones 157 whereat the edge 174 of the first region 146 and the edge 176 of the second region 152 of the passage opening 144 merge into one another do not—as seen from the central axis 150 of the washer 126—have convexly curved edges, but rather, each has an edge 172 which runs tangentially to the edge 174 of the first region 146 of the passage opening 144 and tangentially to the edge 176 of the second region 152 of the passage opening 144 instead.

Consequently, in this second embodiment, the passage opening 144 in the washer 126 does not have a keyhole shaped outline as in the first embodiment, but rather, it takes the form of an elongated hole having different radii of curvature at the two ends of the elongated hole instead.

In this embodiment too, the threaded portion 134 of the screw member 124 can be passed through the second region 152 of the passage opening 144 and afterwards the screw member 124 can be pushed from the second region 152 into the first region 146 of the passage opening 144 so that the threaded portion 134 of the screw member 124 can no longer return through the passage opening 144.

In all other respects, the second embodiment of the combination of a screw member 124, a sleeve 128, a washer 126 and a ring-shaped element 130 illustrated in FIGS. 5 and 6 agrees as regards the construction, functioning and manner of production thereof with the first embodiment illustrated in FIGS. 1 to 4 to the above description of which hereinabove reference is, to this extent, made.

The invention claimed is:

1. A combination of a screw member comprising a screw head, a threaded portion and a shank portion which is arranged between the screw head and the threaded portion and has an external diameter that is smaller than the external diameter of the threaded portion, a slot-free washer incorporating a passage opening for the screw member and a sleeve the internal diameter of which is greater than the external diameter of the threaded portion of the screw member, wherein the passage opening in the washer comprises a first region having a diameter which is greater than the external diameter of the shank portion of the screw member and is smaller than the external diameter of the threaded portion of the screw member, and a second region having a diameter which is greater than the external diameter of the threaded portion of the screw member, and wherein the sleeve and the washer are connected to one another in such a manner that the sleeve and the washer are held captive on the screw member.

2. A combination in accordance with claim 1, wherein the first region and the second region of the passage opening are connected to one another in such a way that the screw member can be transferred from the second region into the first region of the passage opening when the shank portion of the screw member extends through the passage opening in the washer.

3. A combination in accordance with claim 1, wherein, in the assembled state of the combination, the shank portion of the screw member extends through the first region of the passage opening in the washer.

4. A combination in accordance with claim 1, wherein the first region and the second region of the passage opening in the washer partly overlap one another.

5. A combination in accordance with claim 1, wherein the centre of the first region of the passage opening in the washer is arranged substantially centrally of the washer.

6. A combination in accordance with claim 1, wherein the centre of the second region of the passage opening in the washer is displaced outwardly relative to the centre of the first region of the passage opening in the washer.

7. A combination in accordance with claim 1, wherein the edge of the first region of the passage opening in the washer and the edge of the second region of the passage opening in the washer merge into one another at a transitional zone, whereby—as seen from the centre of the first region of the passage opening—the edge of the transitional zone is curved convexly.

8. A combination in accordance with claim 1, wherein the edge of the first region of the passage opening in the washer and the edge of the second region of the passage opening in the washer merge into one another at a transitional zone, whereby the edge of the transitional zone runs substantially tangentially to the edge of the first region of the passage opening and/or substantially tangentially to the edge of the second region of the passage opening.

9. A combination in accordance with claim 1, wherein the combination comprises at least one ring-shaped element which is fixed to the washer and has a seating for the screw head end of the sleeve.

10. A combination in accordance with claim 9, wherein the ring-shaped element is in the form of a resilient element.

11. A combination in accordance with claim 9, wherein the ring-shaped element comprises an elastomer material.

12. A combination in accordance with claim 9, wherein the screw head end of the sleeve is held on the ring-shaped element in positive and/or force-locking manner.

13. A combination in accordance with claim 9, wherein the ring-shaped element is adhered to the washer.

14. A method of making a combination comprising a screw member comprising a screw head, a threaded portion and a shank portion which is arranged between the screw head and the threaded portion and has an external diameter that is smaller than the external diameter of the threaded portion, a washer incorporating a passage opening for the screw member and a sleeve the internal diameter of which is greater than the external diameter of the threaded portion of the screw member, comprising the following method steps:

providing a slot-free washer incorporating a passage opening which includes a first region having a diameter that is greater than the external diameter of the shank portion of the screw member and is smaller than the external diameter of the threaded portion of the screw member, and a second region having a diameter which is greater than the external diameter of the threaded portion of the screw member;

inserting the screw member into the passage opening in the washer in such a manner that the threaded portion of the screw member moves through the second region of the passage opening in the washer until the shank portion of the screw member extends through the passage opening;

transferring the shank portion of the screw member from the second region of the passage opening in the washer into the first region of the passage opening in the washer;

inserting the screw member into the sleeve;

connecting the sleeve to the washer in such a manner that the sleeve and the washer are held captive on the screw member.

15. A method in accordance with claim 14, wherein, furthermore, the method comprises the following:

fixing a ring-shaped element to the washer;

connecting the sleeve to the ring-shaped element in such a manner that the sleeve, the ring-shaped element and the washer are held captive on the screw member.

* * * * *